(12) United States Patent
Saito et al.

(10) Patent No.: US 10,007,067 B2
(45) Date of Patent: Jun. 26, 2018

(54) OPTICAL CONNECTOR ATTACHMENT TOOL HAVING LIGHT TRANSMISSIVE WEDGE

(71) Applicant: AFL TELECOMMUNICATIONS LLC, Duncan, SC (US)

(72) Inventors: Daigo Saito, Greer, SC (US); Roger Vaughn, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days. days.

(21) Appl. No.: 15/123,886

(22) PCT Filed: Mar. 10, 2015

(86) PCT No.: PCT/US2015/119683
§ 371 (c)(1),
(2) Date: Sep. 6, 2016

(87) PCT Pub. No.: WO2015/138434
PCT Pub. Date: Sep. 17, 2015

(65) Prior Publication Data
US 2017/0017049 A1 Jan. 19, 2017

Related U.S. Application Data

(60) Provisional application No. 61/950,685, filed on Mar. 10, 2014.

(51) Int. Cl.
*G02B 6/00* (2006.01)
*G02B 6/38* (2006.01)

(52) U.S. Cl.
CPC ......... *G02B 6/3846* (2013.01); *G02B 6/3802* (2013.01); *G02B 6/3898* (2013.01); *G02B 6/3895* (2013.01)

(58) Field of Classification Search
CPC .. G02B 6/3898; G02B 6/3801; G02B 6/3802; G02B 6/3846
USPC ................................ 385/134, 136, 137, 147
See application file for complete search history.

(56) References Cited

U.S. PATENT DOCUMENTS

| 5,984,532 | A * | 11/1999 | Tamaki | G02B 6/3806 |
|---|---|---|---|---|
| | | | | 385/53 |
| 7,003,208 | B2 * | 2/2006 | Yamaguchi | G02B 6/3855 |
| | | | | 385/134 |
| 7,520,677 | B2 | 4/2009 | Barnes et al. | |
| 7,680,384 | B2 | 3/2010 | Billman et al. | |
| 7,811,006 | B2 * | 10/2010 | Milette | G02B 6/3806 |
| | | | | 385/136 |
| 8,111,967 | B2 * | 2/2012 | Dobbins | G02B 6/3806 |
| | | | | 385/135 |

(Continued)

OTHER PUBLICATIONS

AFL Telecommunications, LLC; International Patent Application No. PCT/US2015/019683; International Search Report; dated Jun. 15, 2015; (2 pages).

*Primary Examiner* — Robert Tavlykaev
(74) *Attorney, Agent, or Firm* — Dority & Manning, P.A.

(57) ABSTRACT

A wedge device for use with a fiber optic connector comprises an insert body comprising a light transmissive material. The insert body defines a wedge portion integrally extending into a light pass structure, the light pass structure terminating in a single upper face distal from the wedge portion. For example, wedge device may be a unitary member formed entirely of the light transmissive material.

20 Claims, 5 Drawing Sheets

(56) References Cited

U.S. PATENT DOCUMENTS

| | | |
|---|---|---|
| 8,718,433 B2 | 5/2014 | Billman et al. |
| 9,002,170 B2 * | 4/2015 | Neitge .................. G02B 6/443 |
| | | 385/139 |
| 2006/0104590 A1 | 5/2006 | Yamaguchi et al. |
| 2011/0119904 A1 | 5/2011 | Nishioka et al. |
| 2011/0273894 A1 | 11/2011 | Duong et al. |
| 2015/0063761 A1 | 3/2015 | Hallett et al. |

* cited by examiner

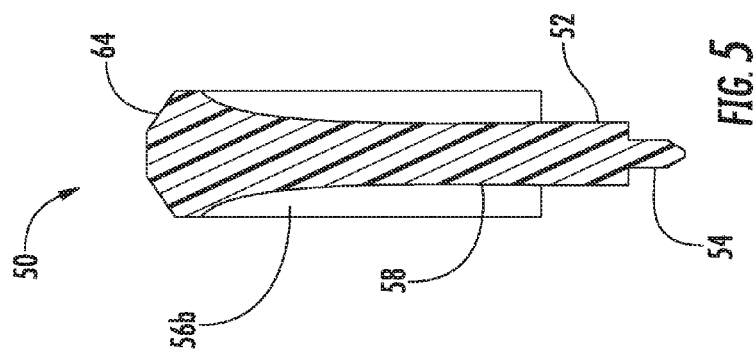
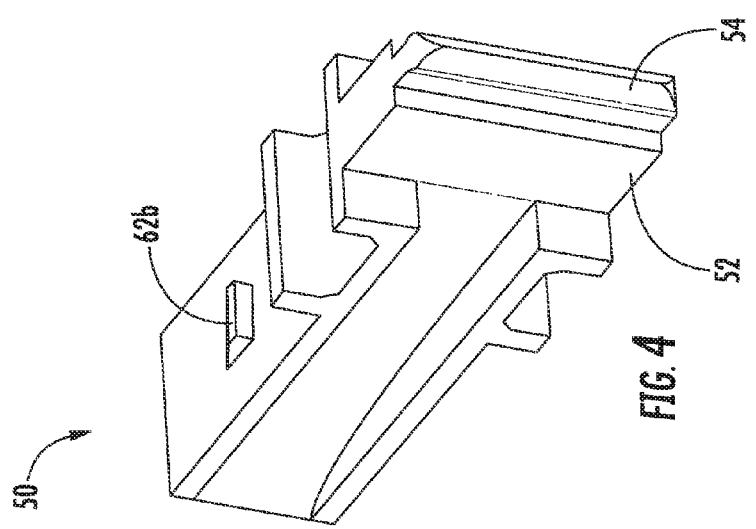
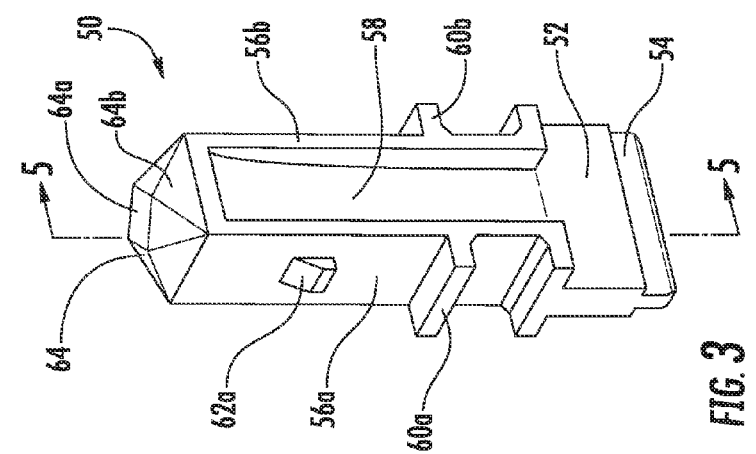

OPTICAL CONNECTOR ATTACHMENT TOOL HAVING LIGHT TRANSMISSIVE WEDGE

CROSS-REFERENCE TO RELATED APPLICATIONS

This application is based upon and claims the benefit of priority from U.S. Provisional Patent Application No. 61/950,685, filed Mar. 10, 2014 in the United States Patent and Trademark Office, and as a U.S. national stage filing of International Application No. PCT/US2015/019683 having an international filing date of Mar. 10, 2015, the disclosures of both of which are incorporated by reference herein in their entireties.

BACKGROUND OF THE INVENTION

The present invention relates generally to fiber optic connectors. More particularly, the present invention relates to an attachment tool for use in fixing an optical connector to the end of a fiber optic cable.

The ability of high-quality optical fiber to transmit large amounts of information without appreciable signal degradation is well known. As a result, optical fibers have found widespread use in many applications, such as voice and data transmission. Optical fibers are often terminated with connectors in the form of plugs that can be quickly mated with corresponding sockets.

One common type of connector is a field installable optical connector. This type of connector can be attached in the field to the end of an optical fiber which has been cut to length. The optical fiber is mechanically spliced to a shorter optical fiber inside the connector housing by abutting end to end. The attachment of an existing optical fiber to the one inside the connector may be achieved using a wedge tool as described in U.S. Pat. No. 7,346,255 to Yamaguchi ("the '255 patent"). The '255 patent is incorporated herein by reference in its entirety for all purposes.

As described in the '255 patent, the wedge tool may include a wedge received in a corresponding hole in a holder which attaches to the optical connector. The holder is configured to allow the edge portion of the wedge to move towards and away from an aligned insertion recess of the connector. The wedge may have a VFI (Visual Fault Identify) function, which enables the installer to identify the mechanical splice connection inside the connector by checking applied visible light from the connector end. In particular, transmitted light is visible as it passes through a transparent wedge. Prior to inserting the fiber into the connector, the light is visible. Once the fiber is inserted, most of the light is channeled through the fiber and attenuates the amount of light present in the wedge. This difference in apparent brightness indicates a good or bad connection. VFI function for a field installable connector is described in European Patent Office published patent application EP 2138879 A1 (published Dec. 30, 2009), incorporated herein by reference in its entirety for all purposes.

Because of the design and shape of the existing prior art wedge, visible light disperses and reduces prominent visibility. Thus, discerning between connected fiber and unconnected fiber is difficult especially in a well-lit environment. The existing design has oppositely-directed catches and an intervening gap that tends to diffuse, rather than concentrate light, which makes it difficult to determine when a fiber connection is complete.

The present invention recognizes the foregoing considerations, and others, of the prior art.

SUMMARY OF THE INVENTION

According to one aspect, the present invention provides a wedge device for use with a fiber optic connector. The wedge device comprises an insert body comprising a light transmissive material. The insert body defines a wedge portion integrally extending into a light pass structure, the light pass structure terminating in a single upper face distal from the wedge portion. For example, wedge device may be a unitary member formed entirely of the light transmissive material.

Preferably, the upper face of the insert body is faceted to define a plurality of planar surfaces. For example, the upper face may comprise a central surface perpendicular to an axis of the insert body. A plurality (e.g., eight) of oblique surfaces surrounding the central surface may also be provided. The insert body may comprise a projection at which the wedge portion is located, having a width less than a width of the upper face. In this case, the light pass structure may preferably increase in width between the projection and the upper face. For example, the light pass structure may gradually and continuously increases in width until it has a width substantially equal to the width of the upper face.

The wedge device may also comprise spaced apart first and second sidewalls delimiting the light pass structure. First and second lateral flanges may extend from the first and second sidewalls, respectively, to limit insertion of the wedge device into a holder. First and second catches projecting laterally from the first and second sidewalls, respectively, may also be provided. The catches are preferably spaced apart from a corresponding one of the first and second flanges along an axis of the insert body.

An additional aspect of the present invention provides a wedge device for use with a fiber optic connector comprising an insert body comprising a light transmissive material. The insert body defines a wedge portion integrally extending into a light pass structure, the light pass structure terminating in an upper face distal from the wedge portion, the upper face being faceted to define a central surface perpendicular to an axis of the insert body and a plurality of oblique surfaces surrounding the central surface.

According to an additional aspect, the present invention provides a combination comprising a wedge device for use with a fiber optic connector. The wedge device has a unitary insert body formed entirely of a light transmissive material. The insert body defines a wedge portion integrally extending into a light pass structure, the light pass structure terminating in an upper face distal from the wedge portion which is faceted to define a plurality of planar surfaces. The combination further includes a holder defining a hole in which a portion of the insert body is received.

Various combinations and subcombinations of the disclosed elements, as well as methods of practicing same, discussed in greater detail below, provide other objects, features and aspects of the present invention.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 3 is a perspective view of a wedge in accordance with an embodiment of the present invention.

FIG. 4 is another perspective view of the wedge of FIG. 3.

FIG. 5 is a cross-sectional view as taken along line 5-5 of FIG. 3.

Figure 1:
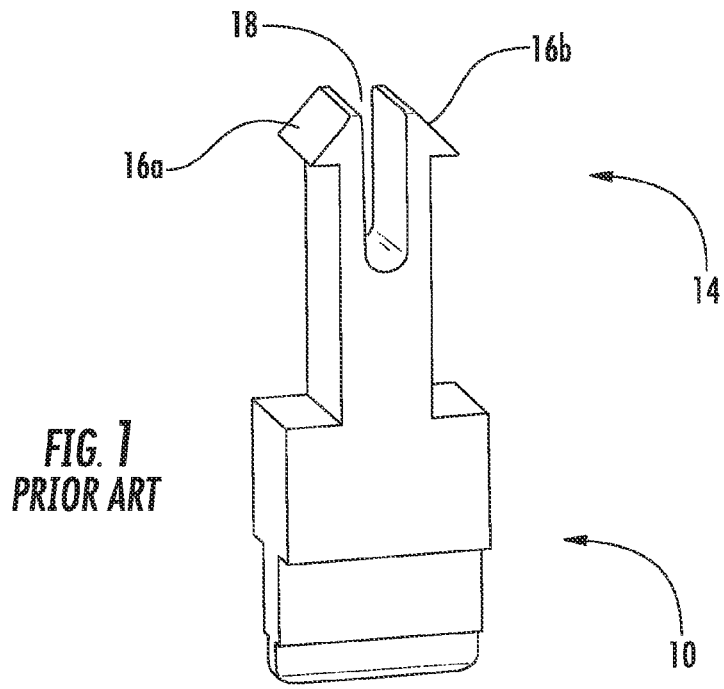
FIG. 1 is a perspective view of a light transmissive wedge of a holder in accordance with the prior art.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 2:
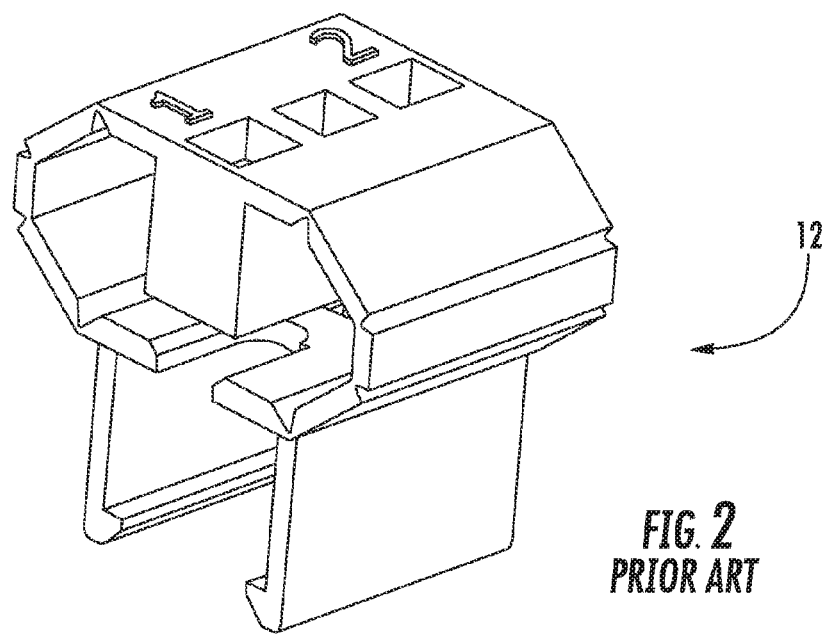
FIG. 2 is a perspective view of a holder in which the wedge is contained in accordance with the prior art.

Referring first to FIGS. 1 and 2, a wedge 10 in accordance with the prior art is adapted to be received in one of two receiving holes (labeled "1" and "2") in holder 12. The structure of wedge 10 and holder 12 is described in detail in the '255 patent, and need not be repeated here. In this case, wedge 10 is made of a light transmissive (i.e., transparent) plastic material to facilitate the determination of whether the mechanical splice was successful.

Figure 7A:
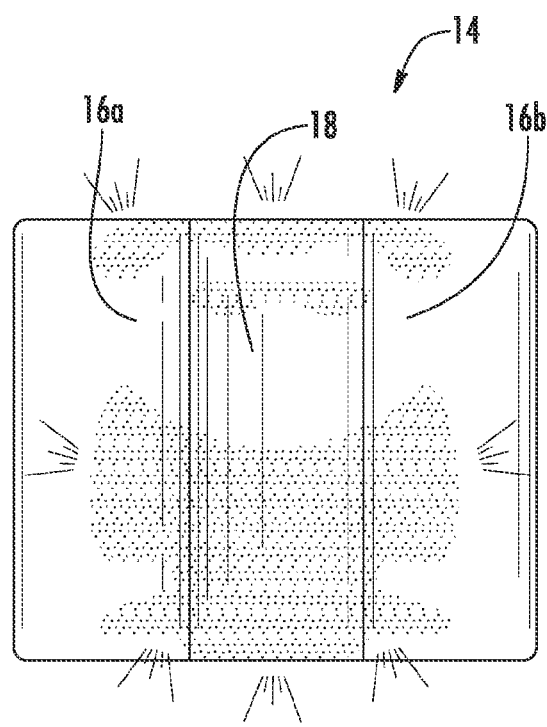
FIGS. 7A and 7B show transmission of light through the prior art wedge of FIG. 1 before and after a good mechanical splice, respectively.
Figure 7B:
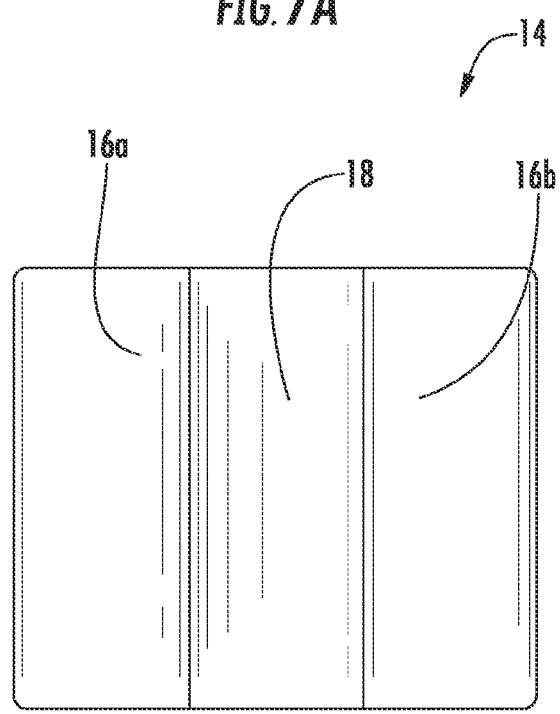

This is illustrated in FIG. 7A, which shows the end portion 14 of wedge 10 before the mechanical splice. In comparison, a lower level of illumination, after a successful mechanical splice, is seen in FIG. 7B. While the difference between illumination in FIGS. 7A and 7B can be readily discerned in many cases, it is not so apparent when ambient light is bright. Moreover, the oppositely-directed catches 16a and 16b, and the intervening gap 18, tends to diffuse, rather than concentrate, the light. Thus, there is room for improvement.

Referring now to FIGS. 3-5, an improved wedge device (or simply "wedge") 50 in accordance with the present invention is illustrated. As can be seen, wedge 50 is preferably formed as a unitary structure of a suitable light transmissive material, such as a suitable clear polymeric material. Wedge 50 includes a projection 52 at the lower portion thereof. A wedge member 54 is located at the distal end of projection 52. As one skilled in the art will appreciate, projection 52 and wedge member 54 are similar to corresponding portions of prior art wedge 10.

The upper portion of wedge 50 defines a pair of side walls 56a and 56b between which a light pass structure 58 is located. As shown, sidewalls 56a and 56b include flanges 60a and 60b which serve to limit insertion of wedge 50 into the holder. Catches 62a and 62b are also located on side walls 56a and 56b, spaced apart from the flanges. One skilled in the art will appreciate that catches 56a and 56b serve a similar function to the upper catches 16a and 16b of wedge 10.

Structure 58 serves to guide the light emitted by the optical fiber end inside the connector up through wedge 50. As can be seen in FIG. 5, structure 58 is configured in this embodiment having a gradual increase in width as it extends to the top of wedge 50. As one skilled in the art will appreciate, the light is not divided as occurred in wedge 10 due to the separate arms carrying upper catches 16a and 16b. Moreover, the upper face 64 of wedge 50 may be faceted as shown (having a plurality of planar faces), or otherwise configured, to enhance the brilliance of the transmitted light. In this embodiment, for example, upper face 64 defines a central surface 64a that is perpendicular to the axis of wedge 50, and a plurality of oblique surfaces (such as surface 64b) that surround central surface 64a. Eight such oblique surfaces are provided in the illustrated embodiment, although a greater or lesser number of such oblique surfaces may be employed as necessary or desired.

Figure 6A:
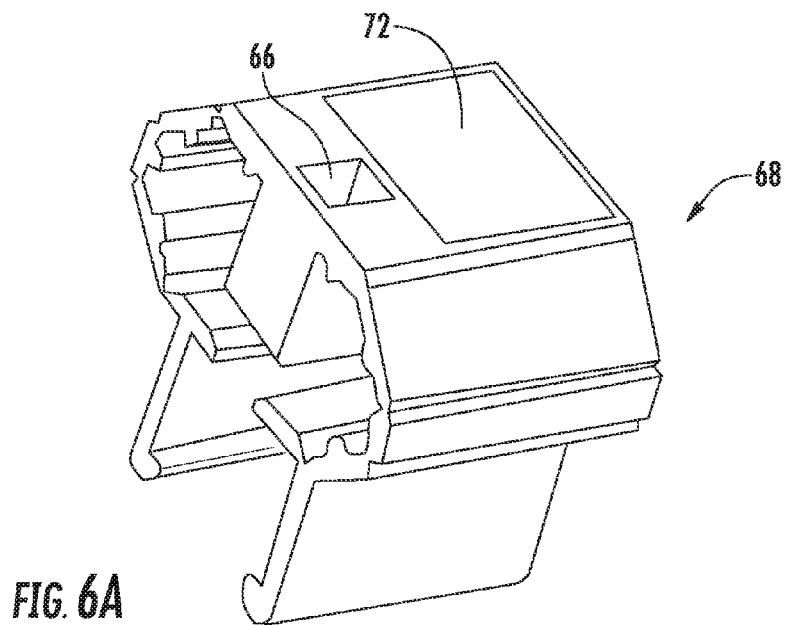
FIG. 6A is a perspective view of a holder in accordance with an embodiment of the present invention.
Figure 6B:
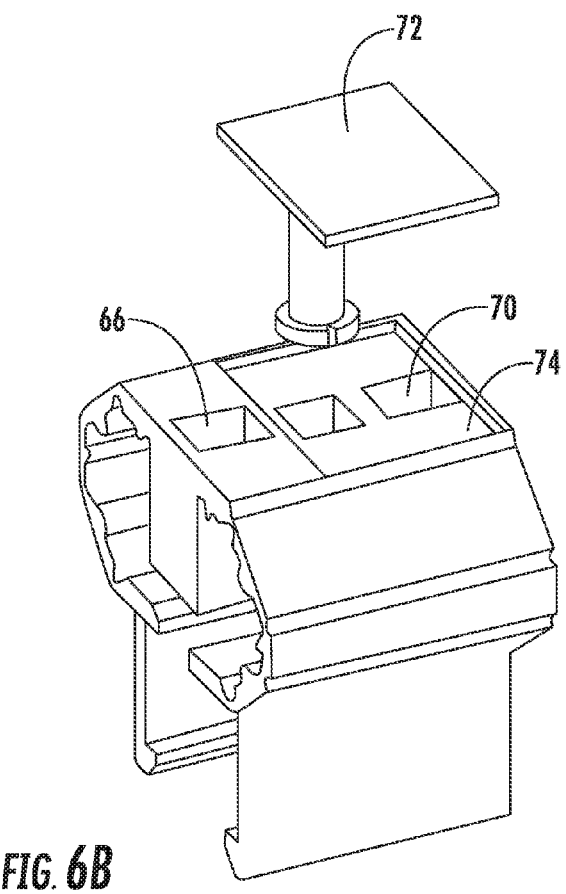
FIG. 6B is a perspective view of a holder with logo removed in accordance with an embodiment of the present invention.

Advantageously, upper face 64 is prominent in the single hole 66 of the holder 68 in FIG. 6A through which light is transmitted, as opposed to the three holes in holder 12. As shown in FIG. 6B, holder 68 may also define a second hole 70, which is revealed by removing a cover 72. The cover 72 may seat in a recess 74 defined in the upper surface of holder 68, to resist movement of the cover but also to enhance overall aesthetics of holder 68. For example, a logo of the manufacturer or other suitable indicia may be provided on cover 72. As one skilled in the art will appreciate, holder 68 is configured is configured to allow the edge portion of the wedge 50 to move towards and away from an aligned insertion recess of the connector.

Figure 8A:
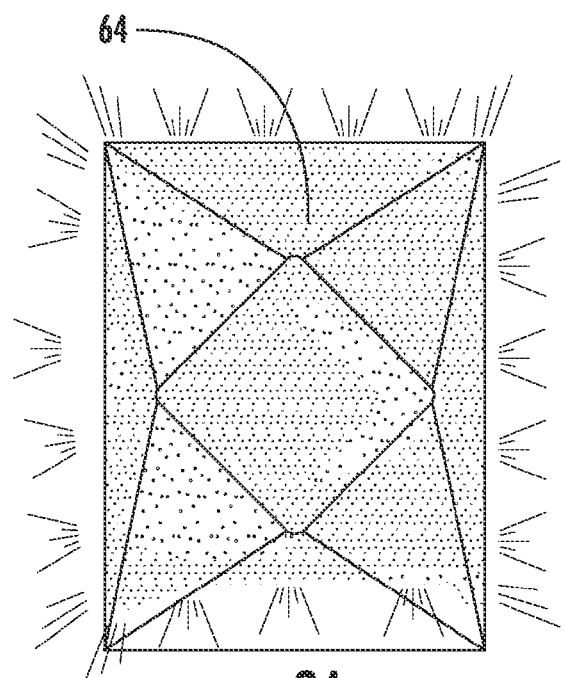
FIGS. 8A and 8B show transmission of light through the wedge of FIG. 3 before and after a good mechanical splice, respectively.
Figure 8B:
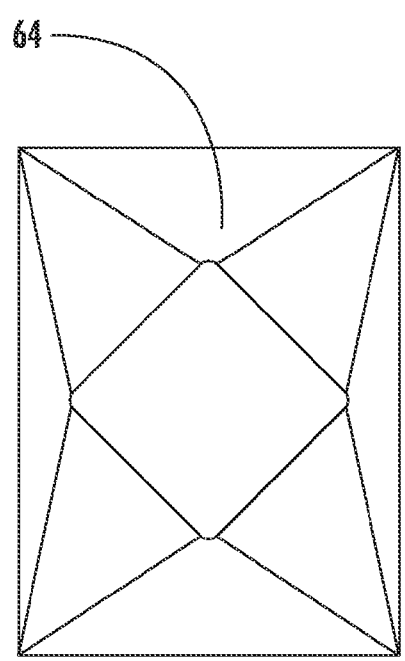

Referring now to FIGS. 8A and 8B, it can be seen that the difference between light intensity levels in good and bad connection situations has been enhanced in comparison with the prior art.

One skilled in the art will appreciate that embodiments of the present invention offer various advantages in comparison with the prior art. For example, a wedge embodiment as described above achieves the following advantages:

1. The new design provides clear brilliant visible light, which is significantly attenuated when mechanical splice connection is made.

2. The new design passes VFI light through the wedge more efficiently.

3. The new design uses a faceted shape on top of wedge to display the channeled light as brilliantly as possible.

While preferred embodiments of the invention have been shown and described, modifications and variations may be made thereto by those of ordinary skill in the art without departing from the spirit and scope of the present invention. For example, the wedge may be formed as a structure unitary with the holder in some embodiments. In addition, it should be understood that aspects of the various embodiments may be interchanged both in whole or in part. Furthermore, those of ordinary skill in the art will appreciate that the foregoing description is by way of example only, and is not intended to be limitative of the invention.

What is claimed is:

1. A wedge device for use with a fiber optic connector comprising:
   an insert body comprising a light transmissive material; and
   said insert body defining a wedge portion integrally extending along a first direction into a light pass structure, said light pass structure terminating in a single upper face distal from said wedge portion, said insert body further comprising spaced apart first and second sidewalls delimiting said light pass structure, wherein widths at a location along the first direction of said first and second sidewalls are greater than a width at the same location along the first direction of the light pass structure for at least a portion of the light pass structure, wherein all of the widths are in a second direction transverse to the first direction.

2. A wedge device as set forth in claim 1, wherein said upper face is faceted to define a plurality of planar surfaces.

3. A wedge device as set forth in claim 2, wherein said upper face comprises a central surface perpendicular to an axis of said insert body.

4. A wedge device as set forth in claim 3, wherein said upper face comprises a plurality of oblique surfaces surrounding said central surface.

5. A wedge device as set forth in claim 4, wherein said insert body comprises a projection at which said wedge portion is located, said projection having a width less than a width of said upper face.

6. A wedge device as set forth in claim 5, wherein said light pass structure increases in width between said projection and said upper face.

7. A wedge device as set forth in claim 6, wherein said light pass structure gradually and continuously increases in width until it has a width substantially equal to said width of said upper face.

8. A wedge device as set forth in claim 1, further comprising first and second lateral flanges extending from said first and second sidewalls, respectively, to limit insertion of said wedge device into a holder.

9. A wedge device as set forth in claim 8, further comprising first and second catches projecting laterally from said first and second sidewalls, respectively, said catches being spaced apart from a corresponding one of said first and second flanges along an axis of said insert body.

10. A wedge device as set forth in claim 1, wherein said wedge device is a unitary member formed entirely of said light transmissive material.

11. A wedge device as set forth in claim 1, further comprising a holder defining a hole in which a portion of said insert body is received.

12. A wedge device as set forth in claim 1, wherein the widths of the first and second sidewalls are equal to a width of the single upper face.

13. A wedge device for use with a fiber optic connector comprising:
an insert body comprising a light transmissive material; and
said insert body defining a wedge portion integrally extending along a first direction into a light pass structure, said light pass structure terminating in an upper face distal from said wedge portion, said upper face being faceted to define a central surface perpendicular to an axis of said insert body and a plurality of oblique surfaces surrounding said central surface, said insert body further comprising spaced apart first and second sidewalls delimiting said light pass structure, wherein widths at a location along the first direction of said first and second sidewalls are greater than a width at the same location along the first direction of the light pass structure for at least a portion of the light pass structure, wherein all of the widths are in a second direction transverse to the first direction.

14. A wedge device as set forth in claim 13, wherein plurality of oblique surfaces comprises at least eight of said oblique surfaces.

15. A wedge device as set forth in claim 13, wherein said insert body comprises a projection at which said wedge portion is located, said projection having a width less than a width of said upper face, said light pass structure increases in width between said projection and said upper face.

16. A wedge device as set forth in claim 13, wherein said wedge device is a unitary member formed entirely of said light transmissive material.

17. A wedge device as set forth in claim 13, wherein the widths of the first and second sidewalls are equal to a width of the upper face.

18. A combination comprising:
a wedge device for use with a fiber optic connector, said wedge device having a unitary insert body formed entirely of a light transmissive material, said insert body defining a wedge portion integrally extending along a first direction into a light pass structure, said light pass structure terminating in an upper face distal from said wedge portion, said upper face being faceted to define a plurality of planar surfaces, said insert body further comprising spaced apart first and second sidewalls delimiting said light pass structure, wherein widths at a location along the first direction of said first and second sidewalls are greater than a width at the same location along the first direction of the light pass structure for at least a portion of the light pass structure, wherein all of the widths are in a second direction transverse to the first direction; and
a holder defining a hole in which a portion of said insert body is received.

19. A combination as set forth in claim 18, wherein said holder defines a second hole covered by a removable cover.

20. A combination as set forth in claim 18, wherein the widths of the first and second sidewalls are equal to a width of the upper face.

* * * * *